UNITED STATES PATENT OFFICE.

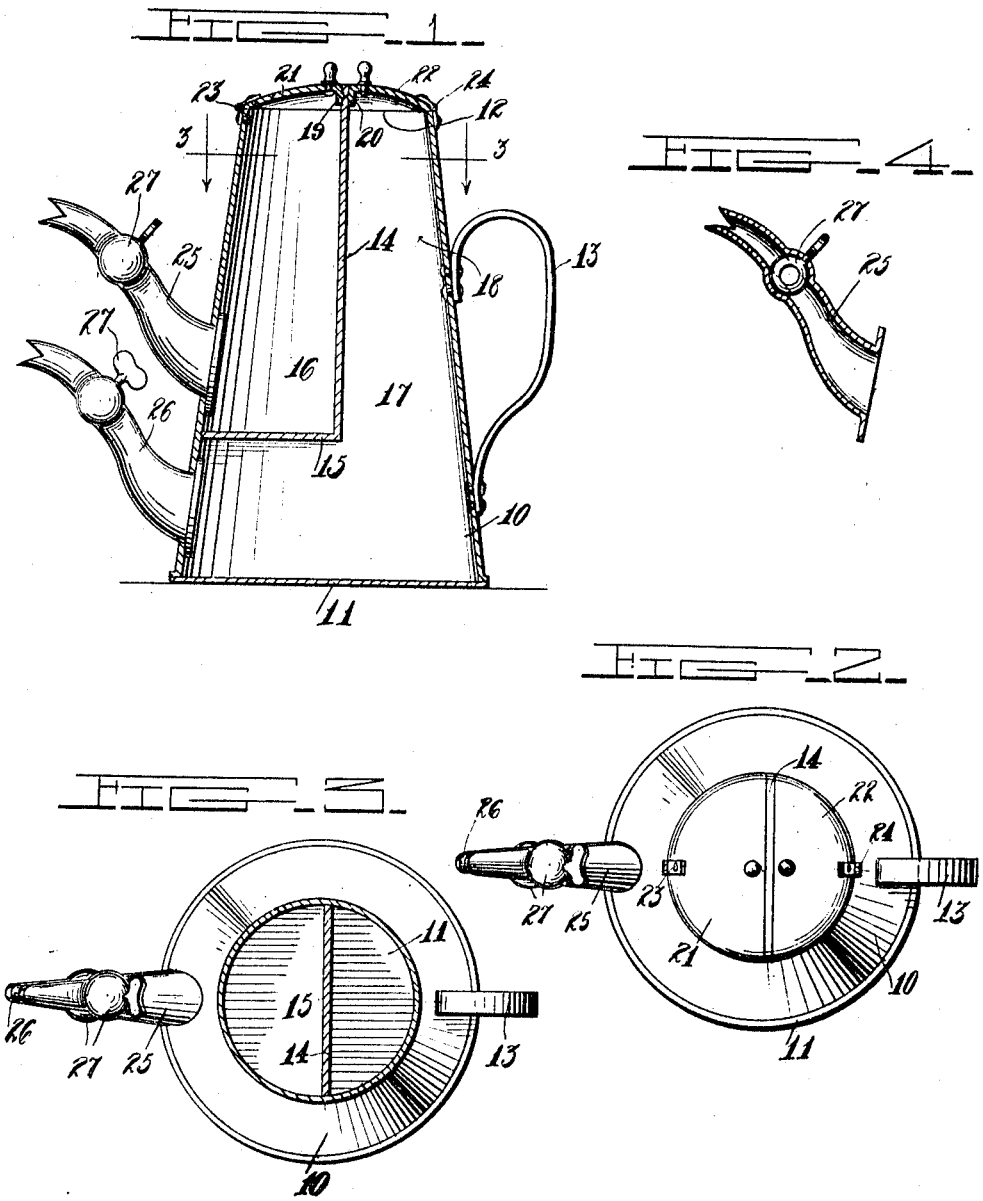

JAMES R. BEASLEY, OF LYNCHBURG, VIRGINIA.

COMBINED COFFEE AND TEA POT.

1,035,407.  Specification of Letters Patent.  Patented Aug. 13, 1912.

Application filed June 13, 1911. Serial No. 632,840.

*To all whom it may concern:*

Be it known that I, JAMES R. BEASLEY, a citizen of the United States, residing at Lynchburg, in the county of Campbell, State of Virginia, have invented certain new and useful Improvements in Combined Coffee and Tea Pots; and I do hereby declare the following to be a full, clear, and exact description of the invention, such as will enable others skilled in the art to which it appertains to make and use the same.

This invention relates to combined coffee and tea pots and has for its object to provide a simple and efficient device of this character in which tea and coffee may be prepared at the same time but which may be individually poured or dispensed.

A still further object is to provide a partition which is arranged in a novel manner to divide the body of the pot into separate compartments, each having valve controlled spouts, the partition near its upper end serving for the attachment of locking latches carried by the hinged covers arranged for each compartment.

With these and other objects in view the invention consists in certain other combinations and arrangements of parts as will be hereinafter more fully described and claimed, it being a still further object to provide a device which will not be likely to get out of working order.

In the drawings:—Figure 1 is a vertical sectional view of a combined coffee and tea pot constructed in accordance with my invention. Fig. 2 is a top plan view thereof. Fig. 3 is a transverse sectional view on the line 3—3 of Fig. 1. Fig. 4 is a detailed sectional view of one of the spouts and valves arranged therein.

Referring to the drawings, there is shown the main body 10 of the pot which is preferably conical in shape and which is provided with a bottom 11 and an open top 12.
In my improved construction, I employ a vertical and rectilinear partition 14 which is secured at opposite sides to the interior wall of the body and which is provided with a bottom 15 disposed at right angles thereto, thus dividing the said body into the compartments 16 and 17 adapted more especially for containing tea and coffee respectively. As will be clearly seen from Fig. 1 of the drawings, the bottom 15 terminates above the bottom 11 of the body 10 and forms a passage 18 between the partition 14 and the adjacent portion of the body to which the handle is attached, thereby providing separate entrance openings through which the coffee and tea may be placed in separate compartments and supplied with water in the usual manner.

The partition 14 projects slightly above the upper edge of the body 10 at the entrance opening 12 and adapted to be engaged by the separate latches 19 and 20 carried by the flat inner sides of the covers 21 and 22 provided for the compartments 16 and 17 respectively. These covers are hinged to the body of the pot upon diametrically opposite sides thereof as shown at 23 and 24 respectively and adapted to be swung on said hinges in the opening and closing thereof to obtain access to the compartments, either separately or simultaneously and to permit placing of the contents or washing of the interior of the compartments as desired.

Arranged upon the diametrically opposite portion of the pot with relation to the handle 13 are upper and lower spouts 25 and 26 which are arranged in the same vertical plane and adapted for dispensing the contents or tea and coffee from the separate chambers and it will be further observed that the spout 26 is arranged adjacent to the bottom 15 of the chamber 16 so that proper pouring of the contents of the chamber 17 may be accomplished. Each of the spouts 25 and 26 is arranged with a suitable valve 27 which permits the contents of the compartments or the coffee and tea to be separately dispensed and it is further evident that the handle 13 suffices for both spouts and is arranged diametrically opposite to both for proper dispensing of the contents.

From the foregoing description, it will be apparent that the coffee and tea or two kinds of beverages may be prepared at the same time and by reason of providing one pot with two compartments having separate spouts, greater convenience is thus maintained in the dispensing thereof.

I claim:—

In a device of the character described, a body of conical form, a vertical partition having a bottom secured to the interior wall of the body and dividing the same into separate compartments, separate closures for the upper ends of the compartments, a handle secured to one side of the body, spouts for each compartment and arranged in a common vertical plane diametrically opposite to the handle and valves arranged in the spouts.

In testimony whereof, I affix my signature, in presence of two witnesses.

JAMES R. BEASLEY.

Witnesses:
ELMER J. PARKER,
WILLIAM P. PRESTON.